Figure 1:
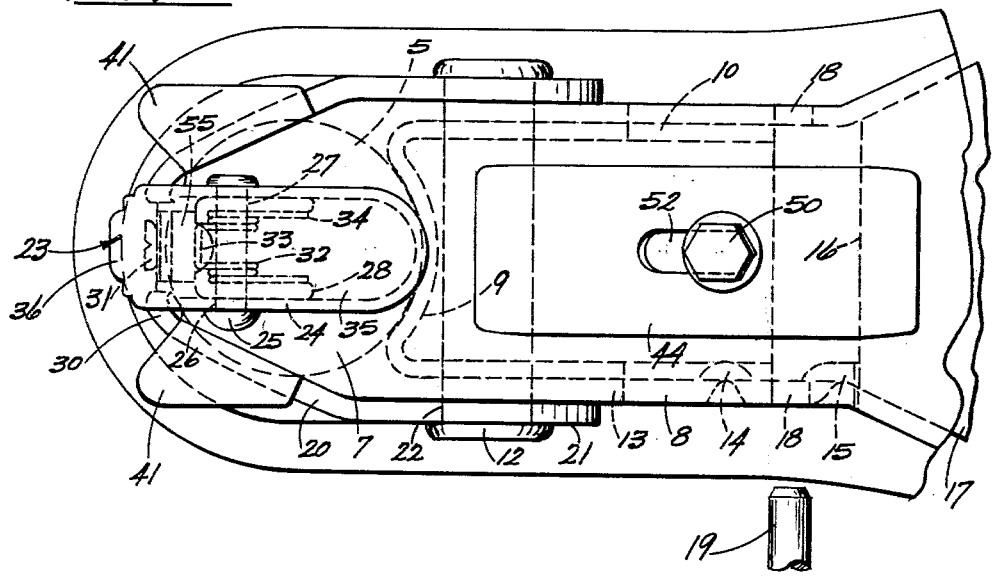

Dec. 29, 1964   J. R. KIRK ETAL   3,163,445
TRAILER COUPLINGS
Filed Oct. 2, 1961                          4 Sheets-Sheet 1

INVENTORS
AGNAR JOHNSON, DECEASED
JOSEPH R. KIRK & EDWIN L. ALLEN
(OLIVER NELSON-ADMINISTRATOR
FOR THE SAID AGNAR JOHNSON)
Andrew F. Wintercorn ATTY.

Dec. 29, 1964   J. R. KIRK ETAL   3,163,445
TRAILER COUPLINGS

Filed Oct. 2, 1961   4 Sheets-Sheet 2

INVENTORS
AGNAR JOHNSON — DECEASED
JOSEPH R. KIRK & EDWIN L. ALLEN
(OLIVER NELSON - ADMINISTRATOR
FOR THE SAID AGNAR JOHNSON)
ATTY.

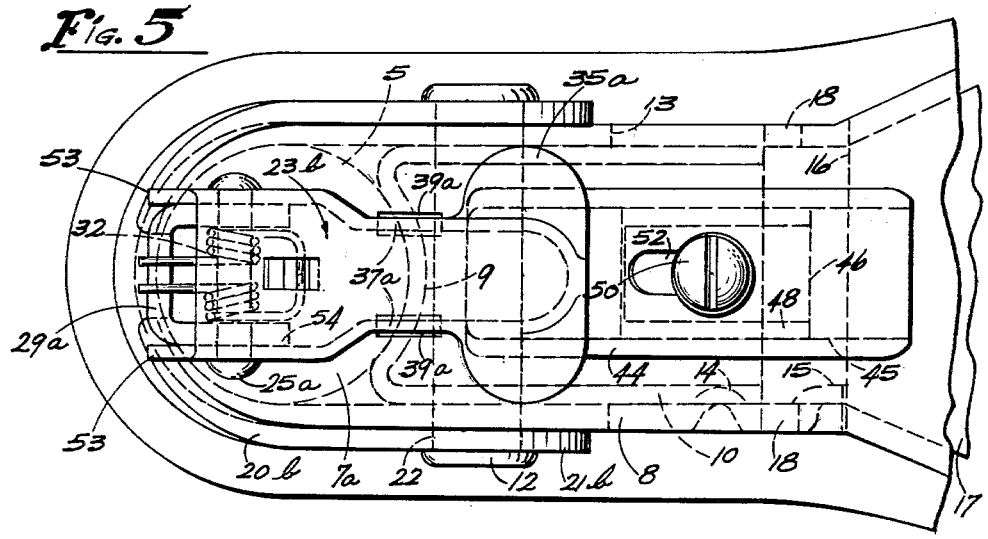
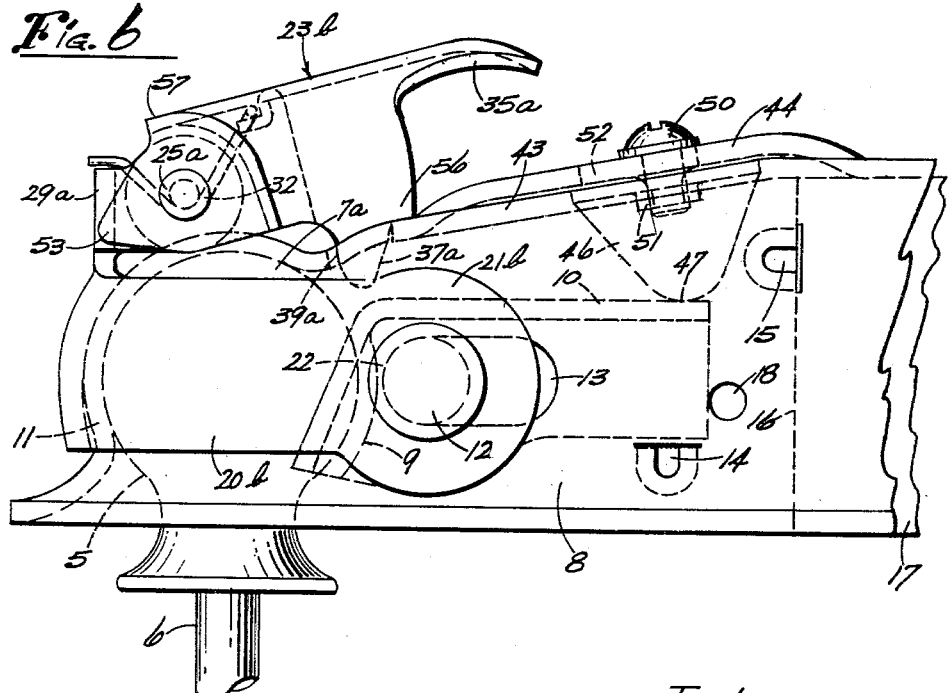

Dec. 29, 1964   J. R. KIRK ETAL   3,163,445
TRAILER COUPLINGS
Filed Oct. 2, 1961   4 Sheets-Sheet 4
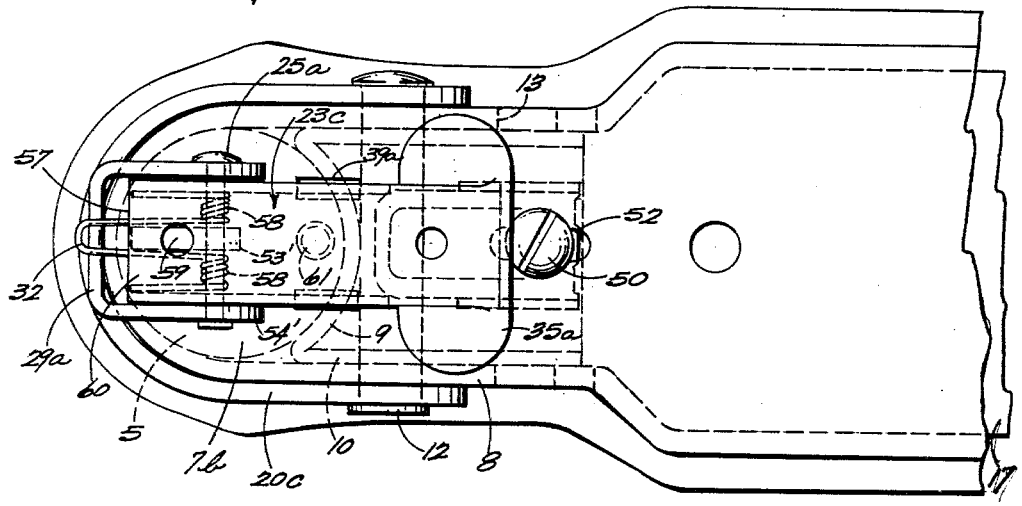
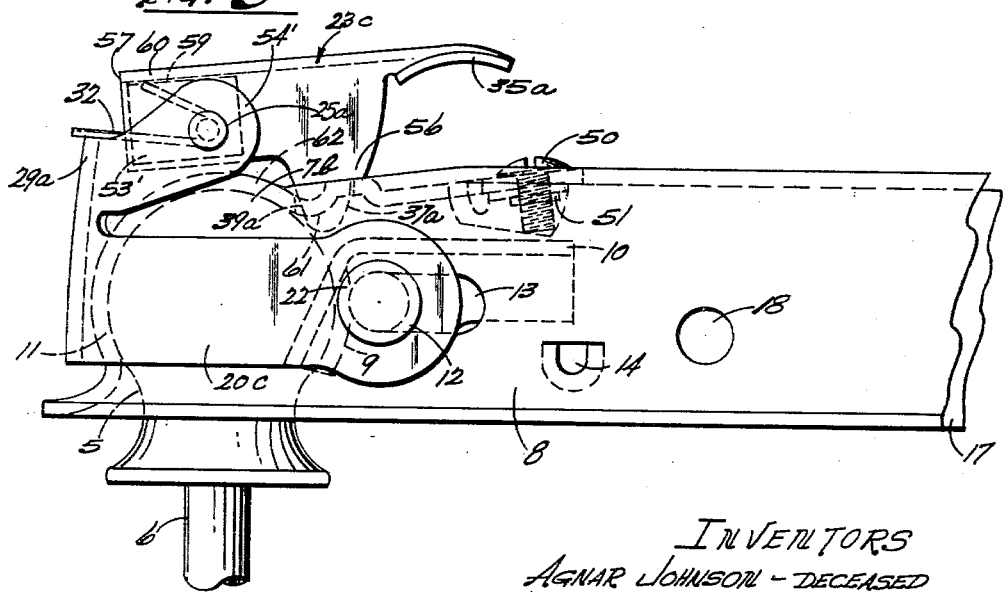
INVENTORS
AGNAR JOHNSON - DECEASED
JOSEPH R. KIRK & EDWIN L. ALLEN
(OLIVER NELSON, ADMINISTRATOR
FOR THE SAID AGNAR JOHNSON)
Andrew F. Wintercorn ATTY.

United States Patent Office 3,163,445
Patented Dec. 29, 1964

3,163,445
TRAILER COUPLINGS
Joseph R. Kirk and Edwin L. Allen, Rockford, Ill., and Agnar Johnson, deceased, late of Rockford, Ill., by Oliver Nelson, administrator, Rockford, Ill., assignors to Atwood Vacuum Machine Company, Rockford, Ill., a corporation of Illinois
Filed Oct. 2, 1961, Ser. No. 142,433
17 Claims. (Cl. 280—513)

This invention relates to trailer couplings and more particularly the ball and socket type, the present invention being especially concerned with improvements in the means for opening and closing the socket and locking the parts securely in closed condition while still permitting easy unlocking and opening whenever necessary.

A salient feature of our invention is the provision of a generally U-shaped horizontal yoke member straddling the socket member from the front end and pivotally connected by means of its arms to a cross-pin slidable in horizontal slots provided in the opposite side walls of the socket member behind the socket, this cross-pin carrying a channel shaped bearing member that is slidable back and forth inside the channel shaped rear portion of the socket member and recessed on its front end spheroidally to bear on the ballhead from behind and hold it in the socket, said bearing member being held in that position by the yoke which is swingable downwardly to the horizontal operative position from a raised, retracted position and being adapted to be locked releasably in the operative position.

In accordance with the present invention:

(1) An elongated latch member, in the preferred form, is pivoted at one end with respect to an upward extension on the U-shaped horizontal yoke member and is spring-pressed in one direction to engage teeth on the other end in slots provided in the top wall of the socket member behind the socket, this latch member having triangular-shaped cam projections on the pivoted end thereof slidably engaging the top wall of the socket, so that when the latch member is swung upwardly to disengage the teeth from the slots the cam-shaped projections riding on the top of the socket serve to cam the front end of the yoke member upwardly from the horizontal operative position straddling the socket and holding the slidable bearing member in its forward ball retaining position with respect to the socket, to a raised, retracted position for release of the ballhead, swinging movement of the latch relative to the yoke being positively limited when the latch has been moved through approximately 90°;

(2) The latch member, in another form, is L-shaped and pivotally mounted on an extension of the cross-portion of the yoke and is normally spring-pressed toward locking engagement of a tooth on the end of one arm thereof in registering apertures in the cross-portion of the U-shaped yoke member and the front wall of the socket, whereby to lock the yoke that controls the position of the bearing member securely in its horizontal operative position and yet permit its being quickly and easily unlocked by manual operation of the end of the other arm of the latch remote from the tooth;

(3) The last named latch member has laterally projecting ears provided on opposite sides thereof near the toothed end to facilitate manual operation of the latch member in the locking and unlocking of the coupling without danger of pinching fingers in these operations, the yoke in the other form having laterally projecting ears thereon for direct manipulation of said yoke when the latch is released, and (4) The bearing member, which is slidable back and forth in the socket member in each of the three forms, is pivoted by means of the cross-pin near its forward end and closely behind its spheroidally recessed front end bearing portion and has its rear end portion free to oscillate up and down to a limited extent, downward movement being limited by engagement on a shoulder provided on one side wall of the channel-shaped rear end portion of the socket member, and upward movement being limited by means of a cam adjustably mounted on the top wall of the channel shaped rear end portion of the socket member, the latter being inclined downwardly toward the socket and having a screw slidably adjustable along a longitudinally extending slot provided therein, the screw serving to secure the cam in adjusted position relative to the top of the inner end portion of the bearing member for upward tilting adjustment of the forward end of said member about its cross-pin as a fulcrum to a desired position with respect to the ballhead at the time of initial assembling and enable making further adjustments later to have the ballhead fit closely enough in the socket regardless of wear on all of the parts, the cam being adjusted forwardly more and more to compensate for wear, only a slight amount of adjustment of the cam being required in any given instance to secure the desired close fit of the ballhead in the socket and yet avoid having it fit too tightly.

The invention is illustrated in the accompanying drawings in which—

Figure 2:
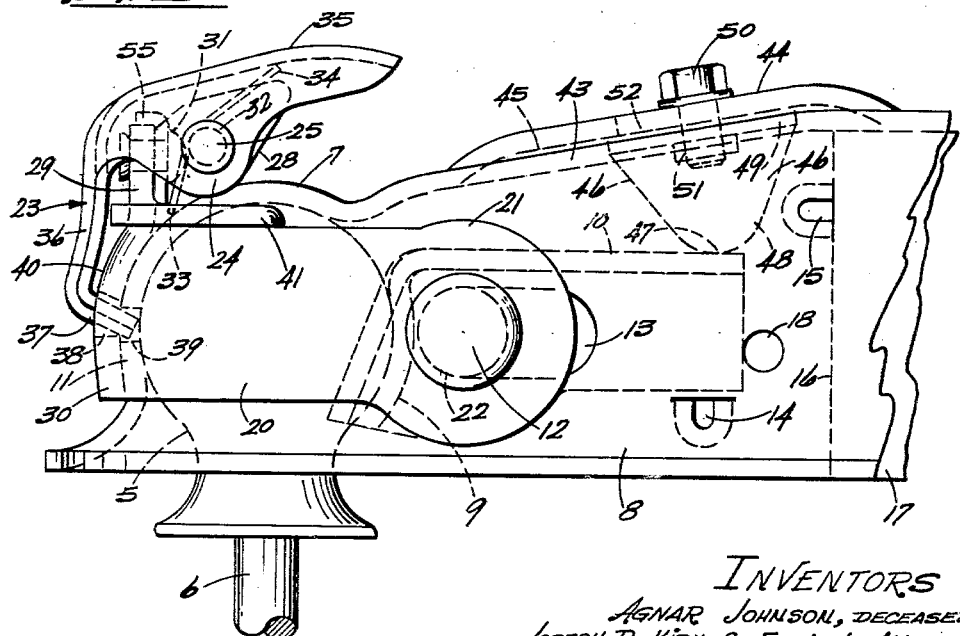
Figure 3:
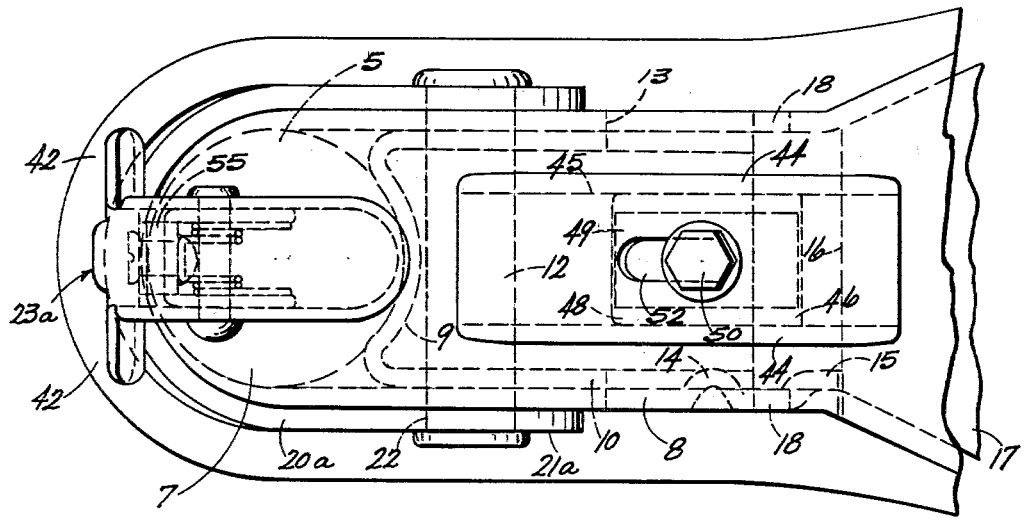
Figure 4:
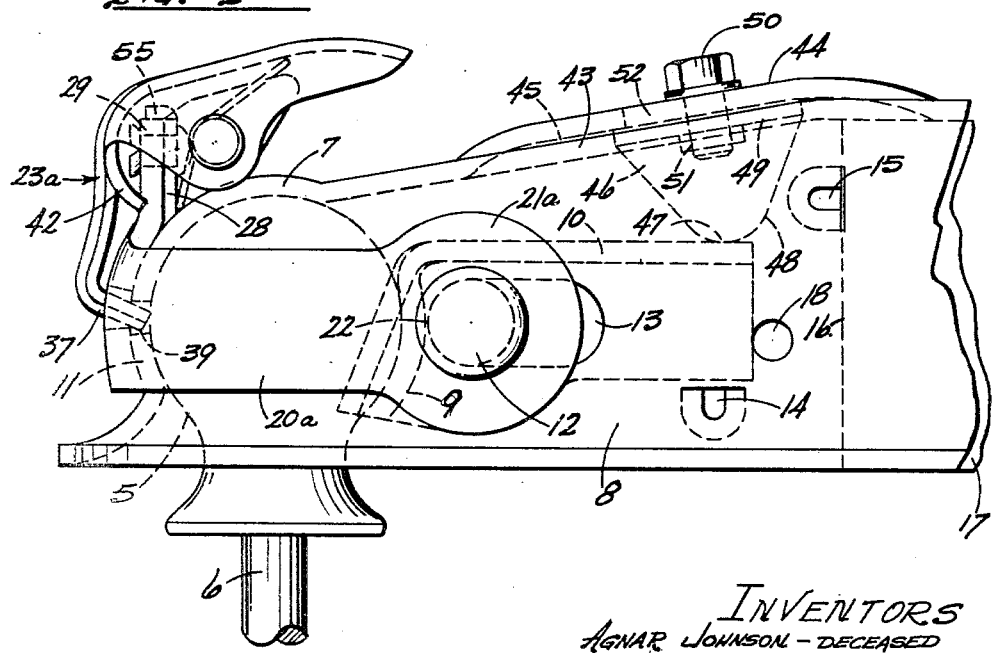

FIGS. 1 and 2 are a top view and side view, respectively, of a trailer coupling made in accordance with one form of our invention, showing the parts in closed position to retain a ballhead in the socket;

FIGS. 3 and 4 are views similar to views 1 and 2 showing a closely similar construction but with a modified form of latch;

FIGS. 5 and 6 are another two similar views showing the preferred form of our invention in which still another form of latch is employed, and FIGS. 7 and 8 are another two views similar to FIGS. 5 and 6 showing a further variation of the preferred form of our invention, especially designed to suit the needs of smaller size couplers.

Similar reference numerals are applied to corresponding parts throughout the views.

Referring first to FIGS. 1 and 2, the reference numeral 5 designates the ballhead that is usually mounted by means of an attaching shank 6 to a rear portion of the towing vehicle, and 7 designates a socket provided on the front end portion of an elongated sheet metal channel member 8 carried on and rigid with the front end of the trailer to be hauled by the towing vehicle when the ballhead 5 has been entered in the socket 7 for swivel connection with the trailer and has been locked in place in said socket to eliminate any likelihood of accidental uncoupling of the trailer. The socket 7 is open on the bottom to receive the ballhead 5 and is closed by a bearing 9 on a sheet metal channel member 10 that is reciprocable horizontally inside the channel 8 and has the bearing 9 defined by a spherically conformed transverse wall on its front end struck on the same radius as the walls 11 on the front end, side and top of the socket 7 and is arranged to engage the ballhead 5 from the rear to complete the socket and retain the ballhead therein. A horizontal cross-pin 12 slidable in horizontal slots 13 provided in the side walls of channel 8, supports the front end of channel 10 for reciprocation in the channel 8, and there is at least one indented eye-brow projection 14 provided in one side wall of channel 8 arranged to limit oscillation of channel 10 about pin 12 in a downward direction and also be slidably engaged by the bottom edge of channel 10 to guide the latter in its reciprocatory movement. Another eye-brow projection 15 is provided on the same side wall of channel 8 in right angle relationship to projection 14 as seen in FIG. 2 and serves by abutment with the vertical front end 16 of a frame 17 on the trailer to locate the channel 8 accurately with respect to the trailer frame preliminary to the rigid fastening of the parts 8 and 17 together, as by bolts and/or rivets not shown. Registering holes 18 provided in the opposed side walls of channel 8 may receive a horizontal cross-pin, like that indicated at 19, FIG. 1, as a matter of safety to prevent any possibility of channel 10 being retracted with respect to ballhead 5 in the event the generally U-shaped horizontal yoke 20 that straddles the front end of the socket 7 and has its two arms 21 pivotally connected at 22 to the opposite ends of the horizontal cross-pin 12 is not safely locked to the socket 7 by means of the latch member 23. A closely similar yoke 20a is shown in FIGS. 3 and 4 and also a closely similar latch member 23a, but yoke 20b and latch member 23b of the preferred form shown in FIGS. 5 and 6 are quite different.

The latch member 23 of FIGS. 1 and 2, which is generally L-shaped and has vertical ears 24 on opposite sides of one leg of the L is pivotally mounted on a horizontal cross-pin 25 that extends through registering holes 26 in these ears and through registering holes 27 in the opposite side walls of a generally U-shaped bracket 28 that is mounted on an upwardly projecting lug 29 provided on the cross-portion 30 on the front end of the U-shaped yoke 20 as by means of a rivet 31. A grasshopper-type spring 32 is mounted on the cross-pin 24 and has one arm 33 bearing against the cross-portion of the U-shaped bracket 28 for abutment and its other arm 34 defined by its two end portions bearing against the under-side of the rearwardly projecting leg 35 of the L-shaped latch member 23. The other and generally vertical leg 36 of the latch member 23 has a tooth or latch lug defined by the rearwardly bent lower end portion 37 that extends through a slot 38 in the cross-portion 30 of the U-shaped yoke 20 and is arranged to engage in a registering slot 39 provided in the front wall of socket 7, whereby to lock the yoke 20 in the position shown in FIG. 2, holding the channel 10 in its forward position to prevent release of the ballhead 5 from socket 7. The rearward curvature of the upper half-portion 40 of the cross-portion 30 of yoke 20 limits the downward swinging movement of said yoke when the slot 38 comes into register with the slot 39, and hence the tooth or lug defined by the rearwardly bent lower end portion 37 on the latch member 23 will snap into place in slot 39 under pressure of spring 32 and automatically lock the coupling without any special attention being required on the part of the operator other than to see that the yoke 20 is swung down far enough to insure the decided locking action. Whenever it is desired to unlock the coupling, it is a simple matter to depress the handle end 35 of the latch member 23 against the resistance of spring 32 so as to disengage the lug or tooth 37 from at least the slot 39, if not also slot 38, so that the yoke 20 can be raised by hand by means of the lugs or ears 41 that project horizontally from opposite sides of the upper front end portion of yoke 20, thereby releasing channel 10 and bearing 9 so that they may be slid to the rear away from ballhead 5 and allow the socket 7 to be removed from said ballhead. It is easy for most operators to do this uncoupling with one hand, holding the latch member 23 released by downward pressure of the palm of the hand while grasping one of the lugs or ears 41 with the fingers in first lifting the yoke 20 and then sliding it rearwardly. If both hands of an operator are used, the latch member 23 can be pressed down by thumb pressure while the lugs or ears 41 are grasped by the fingers of both hands to raise the yoke 20 and then slide it to the rear.

The trailer coupler shown in FIGS. 3 and 4 is substantially the same as the one just described and illustrated in FIGS. 1 and 2 but the latch member 23a has laterally extending lugs or ears 42 adapted to be used as handles in releasing the latch 23a and swinging the yoke 20a upwardly to a retracted position with respect to the socket 7 so that the ballhead 5 can be removed from the socket to uncouple the trailer from the towing vehicle. In the coupler of FIGS. 1 and 2, as has just previously been stated, the operator must press downwardly on the handle end 35 of the latch 23 to release the latch, and while holding the handle down pull upwardly on the laterally extending ears 41 that are provided on the opposite sides of the yoke 20 at the front end, whereby to move the yoke to a retracted position with respect to socket 7 and permit withdrawal of the ballhead 5 from the socket to uncouple the trailer. The uni-directional principle of operation of the latch and yoke assembly of FIGS. 3 and 4 is believed to have certain operating advantages over the other latch and yoke assembly of FIGS. 1 and 2.

In both forms, it will be seen that the channel 8 has an upwardly and rearwardly inclined top wall 43, the middle portion 44 of which is embossed to define a longitudinally extending guideway 45 on its inner side, along which a shoe or cam 46 of U-shaped form is slidably adjustable to change the location of its fulcrum point 47 with respect to the rear end portion of the channel 10 and accordingly make the front socket end 9 have either more or less clearance with respect to the back of the ballhead 5 at the time of initial assembly, and, after the coupler has been in service for a time and enough wear has occurred to warrant takeup for wear, that is possible by some slight forward adjustment of the shoe 46 to compensate for the wear. The fulcrum point 47 is defined by line contact of the rounded lower ends of the two arms 48 of the U-shaped shoe, the cross-portion 49 at the top bearing against the underside of the embossed portion 44 and having a bolt 50 threaded in a hole 51 provided therein, the bolt extending through a slot 52 extending lengthwise of the embossed portion 44 to allow a predetermined range of forward adjustment of the shoe for wear compensation, the bolt 50 being tightened to clamp the shoe 46 in any given position of adjustment.

In operation, after the ballhead 5 has been entered in the socket 7 at the start of a coupling operation, the yoke 20, or 20a, is first pulled forward enough to close the socket on the ballhead by abutment of the socket end 9 on the channel 10 with the back of the ballhead, whereupon the yoke 20, or 20a, can then be swung downwardly over the front end of the socket until the tooth 37 on the latch 23, or 23a, snaps into place in slot 39 under pressure of the spring 32. There will be an audible click when that occurs, so that the operator knows definitely that the coupler is locked. However, he can check it by pulling upwardly on the ears 41 on yoke 20 or on the ears 42 on latch 23a. In both cases, if the latch tooth 37 has dropped into place in slot 39, the yoke cannot be raised without first releasing the latch. To uncouple the trailer, it is only necessary to release the latch and then swing the yoke upwardly and rearwardly to a retracted position, whereupon the ballhead 5 can easily be withdrawn from the socket 7. The eye-brow projection 14 supports the rear end of the channel 10 in the retracted position thereof and serves as a guide for the channel 10 up to the point where the socket end 9 comes into abutment with the back of the ballhead 5. At that point, the adjustment of the shoe 46 determines how snugly the ballhead fits in the socket, and, if the shoe 46 is adjusted far enough forward, the channel 10 will not be apt to oscillate between the eye-brow projection 14 and the shoe 46 and be noisy.

The coupler shown in FIGS. 5 and 6 is similar to the two forms previously described but has a different and preferred form of locking action on the socket 7a by engagement of parallel teeth 37a in parallel slots 39a, which in this preferred form are provided in the top wall of the socket behind the ballhead, and also to have a camming action on the top of the socket 7a by the slidable engagement of its cam-shaped projections 53 on top of said socket after the teeth 37a have been withdrawn from the slots 39a in the counter-clockwise swinging of the latch member 23b on its pivot pin 25a, whereby to force the front end of the yoke 20b upwardly with a minimum amount of manual effort expended for so doing by an upward pull on the T-shaped handle 35a on the latch member 23b. The upwardly projecting lug 29a provided on the front end of the yoke 20b in this form has a pair of rearwardly projecting ears 54 provided thereon to provide supports for the pivot pin 25a and enable mounting the latch member 23b with its grasshopper type spring 32 on the pin, similarly as in the other two forms, where a separate bracket 28 fastened by means of a rivet 31 was provided, having a forwardly bent lug 55 engaging the top of the projection 29 to prevent the bracket 28 from turning about the rivet 31 as an axis. Having the ears 54 integral with the lug 29a greatly simplifies and reduces the cost of the present construction.

In the operation of this coupler, after the ballhead 5 has been entered in the socket 7a the yoke 29a is pulled forward enough to bring the socket end 9 of channel 10 into abutment with the back of the ballhead, whereupon the yoke can be swung downwardly over the front end of the socket, the same as in the other two forms, and, as soon as the teeth 37a come into register with slots 39a they will, of course, snap into place therein under action of the spring 32, the travel being limited by engagement of shoulders 56 on the latch member on top of the socket next to the slots 39a, this being accompanied with a loud enough click for the operator to hear and know that the coupler is definitely locked. Downward pressure can be applied on the handle 35a, if desired, to insure full engagement of the teeth 37a in slots 39a, but that is usually not necessary. To uncouple the trailer, the operator merely lifts on the handle 35a, thereby first withdrawing teeth 37a from slots 39a, after which the cam projections 53 sliding on top of the socket 7a serve to force the yoke 20b upwardly with appreciable mechanical advantage, assuring easy uncoupling, even where the coupling has been closed and locked for a long period and there is an accumulation of dirt and even rust interfering with the uncoupling operation. When the shoulder 57 on the pivoted end of the latch member 23b strikes the top of the lug 29a, the pivotal movement of the latch member 23b with respect to the yoke 20b is positively limited, this being at about the point where the cam projections 53 have forced the yoke 20b upwardly enough to loosen it for easily finishing the retracting movement, after which the balhead is free to be withdrawn from the socket.

The coupler shown in FIGS. 7 and 8, is closely similar to that of FIGS. 5 and 6, but has a separate cam 53' mounted on the pin 25a between the coils 58 of the torsion spring 32 with its flat top 59 arranged for abutment with the web 60 of the channel-shaped latch member 23c on the longitudinal center line thereof and accordingly on the longitudinal center line of the socket 7b, whereby the cam 53', which is preferably of nylon or other suitable plastic material because of the long wearing and good bearing properties of such materials and their freedom from rusting, rides nicely over the top of the socket 7b without any tendency to bind, whereas with a smaller diameter socket, like the socket 7b, if the same type of cam were used as shown at 53 in FIGS. 5 and 6, one would have to make the latch 23b much narrower than is shown in FIGS. 5 and 6, otherwise, due to the extent of dropoff on the top of the socket, due to the smaller radius of socket 7b, there would be a tendency for the cam projections 53 to spread apart, and these cam projections would furthermore have to be made much larger than is shown in FIGS. 5 and 6 to work on top of the socket in the manner intended. The coupler shown in FIGS. 7 and 8 is otherwise the same as that shown in FIGS. 5 and 6, except that the ears 54' on the yoke 20c are disposed outside the latch 23c, instead of inside the latch as in FIGS. 5 and 6, and there is a semi-spherical indentation 61 provided in the top wall of the socket 7c, between the slots 39a on the longitudinal center line of the socket to provide in this smaller diameter socket an extension of the downwardly inclined top wall 62 of the socket to guide or cam the ballhead 5 into the socket in the event it is slightly to the rear of proper registration with the socket at the time of coupling.

It is believed the foregoing description conveys a good understanding of the objects and advantages of our invention. The appended claims have been drawn to cover all legitimate modifications and adaptations.

We claim:

1. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted directly and positively thereon inside the channel, a generally U-shaped yoke having the arms thereoef directly and positively connected to the ends of said pin for swinging movement to and from an operative position closely straddling the socket from the side thereof opposite the open side with the arms of the yoke holding the pin in one end of the slots with the bearing directly and positively retaining the ballhead in the socket and with the cross portion of the yoke abutting the socket on the diametrically opposite side from the bearing element, and latch means mounted on the yoke and operable through an opening provided in the cross portion thereof and under a registering abutment provided on the socket for releasably locking said yoke in this operative position.

2. A coupling as set forth in claim 1 wherein the socket element is of spheroidal form externally, said yoke having the outer end portion thereof conformed to fit the outside of said socket element so as to limit downward swinging movement to operative position.

3. A coupling as set forth in claim 1 wherein the bearing element is elongated and extends lengthwise of the channel and has a bearing on one end for engaging the ballhead, the crosspin extending transversely relative to and supporting said bearing element intermediate the ends thereof for tilting movement, and adjustable means engaging the other end portion of said bearing element to predetermine by the angle of tilt of said bearing element when retaining the ballhead in said socket the operating clearance of said ballhead in said socket.

4. A coupling as set forth in claim 1 wherein the last mentioned means comprises a latch element that is pivotally mounted on said yoke and has a handle portion and a tooth portion provided thereon on opposite sides of the pivot, said socket having a recess provided thereon and the tooth portion being engageable in said recess, and spring means urging said latch element to swing in a direction to engage the tooth in said recess.

5. A coupling as set forth in claim 1 wherein the last mentioned means comprises a latch element that is pivotally mounted on said yoke above the socket and has a handle portion and a tooth portion provided thereon on opposite sides of the pivot, said socket having a recess provided thereon and the tooth portion being engageable in said recess, and spring means urging said latch element to swing in a direction to engage the tooth in said recess, said yoke having a handle projection thereon in proximity to said handle for lifting said yoke to retracted position relative to said socket while said handle is held in a position corresponding to the released position of said latch.

6. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the last mentioned means comprising a latch element that is pivotally mounted on said yoke above the socket and has a handle portion and a tooth portion provided thereon on opposite sides of the pivot, the tooth portion being engageable in a recess provided therefor in said socket, and spring means urging said latch element to swing in a direction to engage the tooth in said recess, said latch element having a handle projection thereon on the opposite side of the pivot from the handle portion which when lifted serves both to retract the latch tooth and the lift the yoke to retracted position.

7. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the last mentioned means comprising a latch element that is pivotally mounted on said yoke above the socket and has a handle portion and a cam portion provided thereon on opposite sides of the pivot, said latch element including a tooth portion on the handle side relative to the pivot and engageable in a recess provided therefor in said socket, and spring means urging said latch element to swing in a direction to engage the tooth in said recess, said cam portion being arranged when said handle portion is lifted relative to said socket to slide on said socket and force said yoke upwardly relative to said socket in timed relation to retraction of the tooth portion from the recess in the socket.

8. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the last mentioned means comprising a latch element that is pivotally mounted on said yoke above the socket and has a handle portion and a cam portion provided thereon on opposite sides of the pivot, said latch element including a tooth portion on the handle side relative to the pivot and engageable in a recess provided therefor in said socket, and spring means urging said latch element to swing in a direction to engage the tooth in said recess, said cam portion being arranged when said handle portion is lifted relative to said socket to slide on said socket and force said yoke upwardly relative to said socket in timed relation to retraction of the tooth portion from the recess in the socket, said handle portion being spaced farther from the pivot than the socket engaging portion of said cam portion, whereby to effect the lifting of said yoke with mechanical advantage.

9. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the bearing element being elongated and extending lengthwise of the channel and having a bearing on one end for engaging the ballhead, the cross-pin extending transversely relative to and supporting said bearing element intermediate the ends thereof for tilting movement, and adjustable means engaging the other end portion of said bearing element to predetermine by the angle of the tilt of said bearing element when retaining the ballhead in said socket the operating clearance of said ballhead in said socket, said channel portion having a longitudinally inclined top wall inclined toward said socket, and said adjustable means comprising an element adjustably fixed to said inclined top wall and extending downwardly therefrom to engage the top of the end portion of the bearing element remote from the bearing end, and means whereby said adjustable element is secured in adjusted position.

10. A coupling as set forth in claim 1 wherein the channel portion also has registering holes provided in the opposed side walls thereof adapted to receive another pin in blocking relation to the bearing element to hold it directly and positively in operative relationship to the ballhead independently of said yoke and its locking means.

11. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the bearing element being elongated and extending lengthwise of the channel and having a bearing on one end for engaging the ballhead, the cross-pin extending transversely relative to and supporting said bearing element intermediate the ends thereof for tilting movement, and means in said channel engaging the other end of said bearing element to limit its tilting element, the channel portion also having registering holes provided in the opposed side walls thereof adapted to receive another pin in blocking relation to the bearing element to hold it in operative relationship to the ballhead independently of said yoke and its locking means.

12. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, the outer end of said yoke and said socket element having openings provided therein which register in this operative position of said yoke, and the last mentioned means comprising a latch element mounted on said yoke and operable to locking engagement in said registering openings.

13. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, the outer end of said yoke and said socket element having openings provided therein which register in this operative position of said yoke, and the last mentioned means comprising a latch element that is pivotally mounted on said yoke and has a handle portion and a tooth portion provided thereon on opposite sides of the pivot, the tooth portion being engageable in said registering openings, and spring means urging said latch element to swing in a direction to engage the tooth in said openings.

14. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, the outer end of said yoke and said socket element having openings provided therein which register in this operative position of said yoke, and the last mentioned means comprising a latch element that is pivotally mounted on said yoke above the socket and has a handle portion and a tooth portion provided thereon on opposite sides of the pivot, the tooth portion being engageable in said registering openings, and spring means urging said latch element to swing in a direction to engage the tooth in said openings, said yoke having a handle projection thereon in proximity to said handle for lifting said yoke to retracted position relative to said socket while said handle is held in a position corresponding to the released position of said latch.

15. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, the outer end of said yoke and said socket element having openings provided therein which register in this operative position of said yoke, and the last mentioned means comprising a latch element that is pivotally mounted on said yoke above the socket and has a handle portion and a tooth portion provided thereon on opposite sides of the pivot, the tooth portion being engageable in said registering openings, and spring means urging said latch element to swing in a direction to engage the tooth in said openings, said latch element having a handle projection thereon on the opposite side of the pivot from the handle portion which when lifted serves both to retract the latch tooth and lift the yoke to retracted position.

16. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, and the last mentioned means comprising a latch element that is pivotally mounted on said yoke above the socket and has a handle portion and a cam portion provided thereon on opposite sides of the pivot, said socket having a recess provided thereon and said latch element including a tooth portion on the handle side relative to the pivot and engageable in said recess, and spring means urging said latch element to swing in a direction to engage the tooth in said recess, said cam portion being arranged when said handle portion is lifted relative to said socket to slide on said socket and force said yoke upwardly relative to said socket in timed relation to retraction of the tooth portion from the recess in the socket.

17. A ball and socket coupling comprising a ballhead element, a socket element open on one side, a bearing element movable in the open side of said socket element retaining and releasing the ballhead in the socket, said socket element including an elongated inverted channel portion on the open side having slots provided in the opposed side walls of the channel longitudinally thereof, a cross-pin extending through said slots and having the movable bearing element mounted thereon inside the channel, a generally U-shaped yoke straddling said socket element and having the arms thereof connected to the ends of said pin for swinging movement to and from an operative position straddling the socket from the side thereof opposite the open side holding the pin in one end of the slots with the bearing retaining the ballhead in the socket, and means for releasably locking said yoke in this operative position, the socket element being of spheroidal form externally, and said yoke having the outer end portion thereof conformed to fit the outside of said socket element so as to limit downward swinging movement to operative position, and the last mentioned means comprising a latch element that is pivotally mounted on said yoke above the socket and has a handle portion and a cam portion provided thereon on opposite sides of the pivot, said socket having a recess provided thereon and said latch element including a tooth portion on the handle side relative to the pivot and engageable in said recess, and spring means urging said latch element to swing in a direction to engage the tooth in said recess, said cam portion being arranged when said handle portion is lifted relative to said socket in slide on said socket and force said yoke upwardly relative to said socket in timed relation to retraction of the tooth portion from the recess in the socket, said handle portion being spaced farther from the pivot than the socket engaging portion of said cam portion, whereby to effect the lifting of said yoke with mechanical advantage.

References Cited in the file of this patent
UNITED STATES PATENTS

| | | |
|---|---|---|
| 2,082,273 | Conkey | June 1, 1937 |
| 2,902,294 | Kirkpatrick | Sept. 1, 1959 |

FOREIGN PATENTS

| | | |
|---|---|---|
| 710,466 | Germany | Sept. 13, 1941 |